United States Patent [19]

Schaefer

[11] Patent Number: 4,918,802
[45] Date of Patent: Apr. 24, 1990

[54] METHOD AND APPARATUS FOR MAKING PERMANENT MAGNET ROTORS

[75] Inventor: Edward J. Schaefer, Bluffton, Ind.

[73] Assignee: Franklin Electric Co., Inc., Bluffton, Ind.

[21] Appl. No.: 306,687

[22] Filed: Feb. 6, 1989

[51] Int. Cl.[5] .............................................. H02K 15/02
[52] U.S. Cl. ...................................... 29/598; 29/736
[58] Field of Search ................ 29/596, 598, 732, 736, 29/733; 310/216, 217, 218, 262; 72/393

[56] References Cited

U.S. PATENT DOCUMENTS

| | | | |
|---|---|---|---|
| 2,461,565 | 2/1949 | Morrill . | |
| 2,498,357 | 2/1950 | Breisch . | |
| 2,645,004 | 7/1953 | Dorner . | |
| 2,721,601 | 10/1955 | Spencer . | |
| 2,877,366 | 3/1959 | Carr | 310/42 |
| 3,067,801 | 12/1962 | Sortor | 72/393 |
| 3,138,859 | 6/1964 | Edwards . | |
| 3,139,677 | 7/1964 | Goldstein . | |
| 3,846,901 | 11/1974 | Lovett . | |
| 4,126,933 | 11/1978 | Anderson et al. . | |
| 4,296,544 | 10/1981 | Burgmeier et al. . | |
| 4,454,437 | 6/1984 | Tanaka et al. . | |
| 4,525,632 | 6/1985 | Tanaka . | |
| 4,636,107 | 1/1987 | Casler et al. . | |
| 4,742,259 | 5/1988 | Schaefer et al. . | |
| 4,759,116 | 7/1988 | Jones . | |
| 4,777,717 | 10/1988 | Okamoto et al. . | |

FOREIGN PATENT DOCUMENTS 1277876 6/1972 United Kingdom .

*Primary Examiner*—Timothy V. Eley
*Attorney, Agent, or Firm*—Marshall, O'Toole, Gerstein, Murray & Bicknell

[57] ABSTRACT

This disclosure relates to a method and apparatus for assembling a rotor for a rotating electric machine, the rotor including a plurality of permanent magnet segments, and an outer sleeve or cylinder. A thin-walled metal cylinder is fashioned and arcuate magnet segments are positioned in angularly spaced relation against the interior surface of the cylinder. The segments are displaced radially outwardly to stretch or expand the outer cylinder, and the segments are then supported in the outwardly displaced positions. The segments may be displaced by a variety of devices including an expanding mandrel, a tapered part of a shaft and a tapered ring.

18 Claims, 2 Drawing Sheets

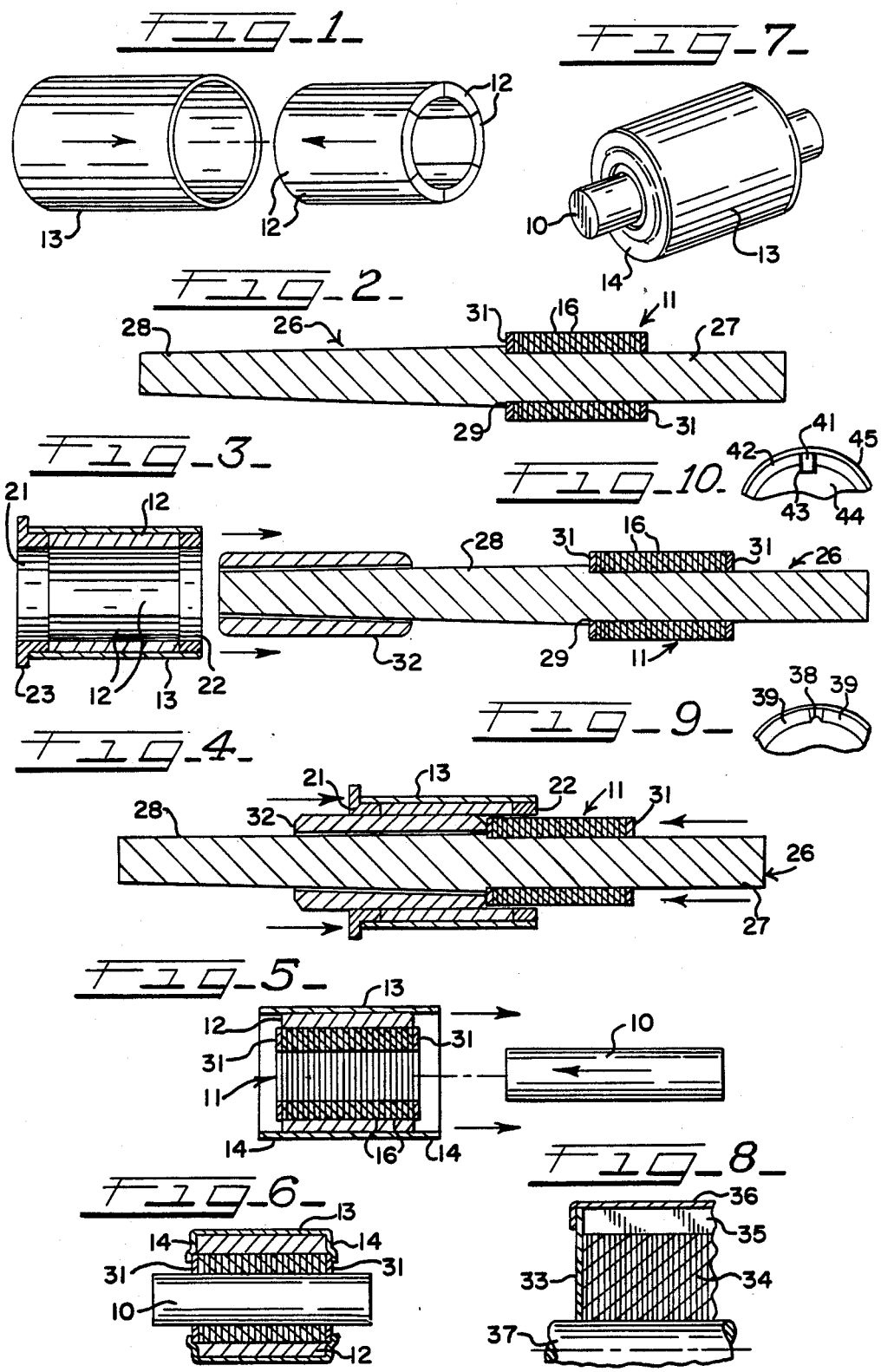

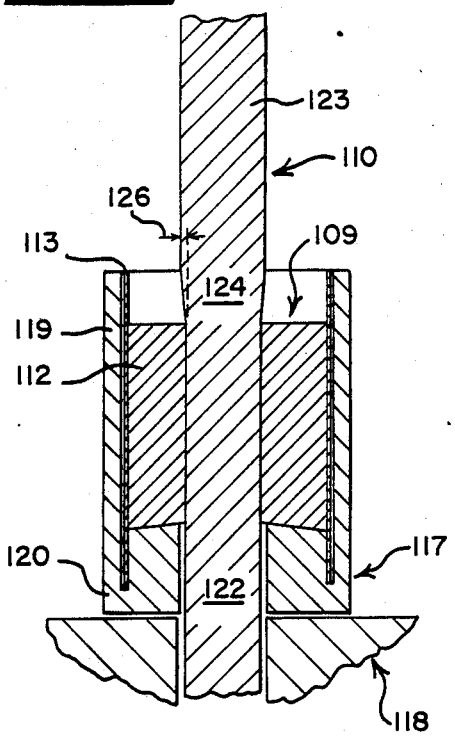
FIG_11_
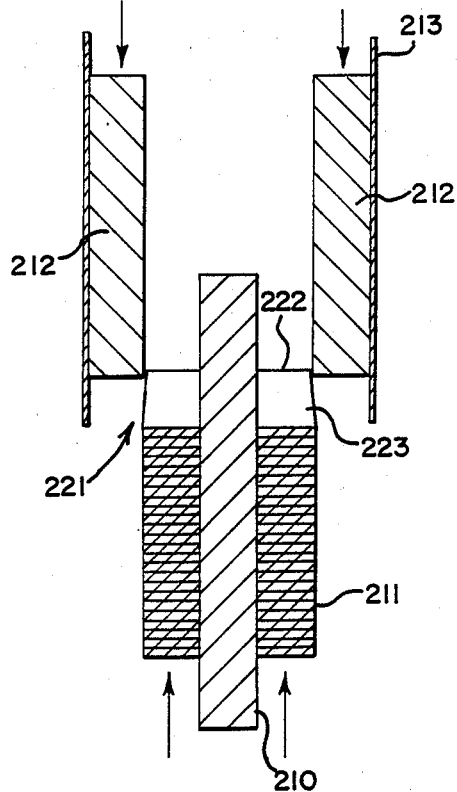
FIG_13_
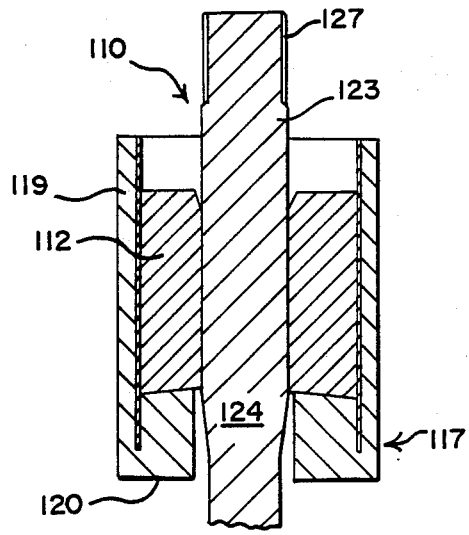
FIG_12_
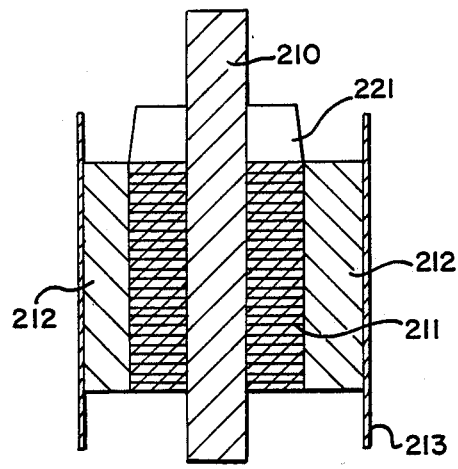
FIG_14_

METHOD AND APPARATUS FOR MAKING PERMANENT MAGNET ROTORS

FIELD AND BACKGROUND OF THE INVENTION

This invention relates generally to rotating electric machines, and more particularly to a method and apparatus for making a permanent magnet rotor for an electric motor.

One type of rotating electric machine, particularly a motor, includes a permanent magnet rotor rotatably mounted in a cylindrical stator. The stator forms a rotating field which turns the rotor. Typically the rotor includes a number of permanent magnet segments fastened to an iron core such as a stack of laminations, and E. J. Schaefer U.S. Pat. No. 4,742,259 shows a rotor of this nature.

A problem with a rotor of this type has to do with the fastening of the magnet segments to the core. The segments must be secured in place because the centrifugal force during high speed rotation tends to throw them off, and the inertia and turning forces on the segments tend to move them circumferentially.

Numerous arrangements have been provided for securing the segments in place. Adhesives have been used but are not satisfactory because of the expansion and contraction of the parts due to temperature variations and, in the case of liquid filled motors, adhesives are not available which will hold up over a long period of time in a wet environment. Various types of wedges and fasteners have been used but they generally result in a complex and expensive structure.

A common method has been to form a cover or sleeve over the outer side of the segments. Covers made of a synthetic material have been provided but they are not believed to be as strong as metal or as resistant to the liquid of a filled motor. A metal sleeve or cylinder over the segments, as shown in the above-mentioned Schaefer U.S. Pat. No. 4,742,259, should be very thin because it is located in the air gap between the rotor and the stator and it should not materially interfere with the field in the air gap. In the instance of a water-filled submersible motor, a cylinder made of thin stainless steel is preferred.

In a rotor including a thin metal sleeve or cylinder over the segments as discussed above, the cylinder should have a residual tension so that it applies a strong holding force on all of the segments. A problem in this connection arises from the nature of the currently available high performance permanent magnets. The magnets are molded of a ceramic material which is very hard, and the molding process results in variations in the radial thicknesses of the segments. One way to make the outer cylinder engage and hold all of the magnet segments would be to grind the segments to an exact thickness, but again this is a relatively expensive process.

In a prior art method, a metal cylinder has been mounted over the segments by initially making the cylinder's internal diameter slightly less than the external diameter of the magnet segments. The cylinder is heated to expand it and it is then placed over the segments and cooled so that it is shrunk over the segments. This method produces the residual tension in the cylinder but it is a relatively difficult process.

The D. W. Jones U.S. Pat. No. 4,759,116, dated July 26, 1988 discloses an arrangement wherein fluid pressure is applied internally of a cylinder in order to expand it, and then a metal core and magnet segments on the core are inserted into the expanded cylinder. When the internal pressure is removed, the cylinder contracts and grips the segments. This arrangement requires a relatively complex sealed chamber arrangement.

The K. Okamoto U.S. Pat. No. 4,777,717, dated Oct. 18, 1988 discloses a method of mounting magnet segments in a cylindrical yoke of a motor. The yoke is first plastically deformed by internal expander elements, the elements are removed, and the magnet segments are inserted in place of the elements. There is no residual tension produced by this method and a two-step process is required.

It is a general object of this invention to provide an improved method and apparatus for assembling a cylinder with magnet segments of a rotor and producing residual tension in the cylinder.

SUMMARY OF THE INVENTION

This invention relates to a method of assembling a rotor for a rotating electric machine, the rotor including a plurality of permanent magnet segments, an outer sleeve or cylinder over the segments, and a support for the segments and the cylinder. A thin-walled metal cylinder is fashioned and arcuate magnet segments are positioned in angularly spaced relation against the interior surface of the cylinder. The segments are displaced outwardly to elastically stretch or expand the outer cylinder. A support is then provided for holding the segments and the cylinder in the displaced positions. The end portions of the outer cylinder may extend beyond the ends of the segments, and in this instance the end portions are turned radially inwardly against the end surfaces of the segments.

Apparatus for practising the method includes means for insertion into the interior of the magnet segments for expanding the segments outwardly against the outer cylinder, and means for supporting the segments.

BRIEF DESCRIPTION OF THE DRAWINGS

The invention may be better understood from the following detailed description taken in conjunction with the accompanying figures of the drawings, wherein:

FIGS. 1 to 6 are views showing assembly steps in accordance with one embodiment of this invention;

FIG. 7 is a perspective view of an assembled rotor;

FIGS. 8 to 10 are views of alternative motor constructions;

FIGS. 11 and 12 illustrate an alternative embodiment of the invention; and

FIGS. 13 and 14 illustrate still another alternative embodiment of the invention.

DETAILED DESCRIPTION OF THE DRAWINGS

With reference first to FIGS. 1 to 7, a rotor constructed in accordance with the present invention comprises a rotor shaft 10 which supports a rotor core 11. A plurality of arcuate permanent magnet segments 12 are mounted on the outer periphery of the core 11. Over the outer surface of the segments 12 is mounted a thin-walled tubular metal cylinder 13 which has an end portion 14 at each axially outer end of the rotor, which is turned radially inwardly and overlies the axially outer ends of the magnet segments 12.

The rotor shaft 10 is normally made of steel and it is shaped to be rotatably supported by bearings (not shown) within a conventional motor stator (also not shown). The core 11 in the present instance is formed by a stack of disk-shaped metal laminations 16 which are made of a magnetic material. The stack is secured to the outer periphery of the shaft 10, and this may be accomplished by forming a tight press-fit between the inner peripheries of the laminations 16 and the outer surface of the shaft 10. In the case of a large horsepower motor, the laminations may be keyed to the shaft. Instead of forming the core 12 from laminations as described, the core could be formed by a solid cylinder formed of a magnetic material mounted on the shaft 10, or the shaft 10 could include a core portion.

The permanent magnet segments 12 may be made of a conventional material and be molded to the arcuate shape illustrated in FIG. 6. Preferably the segments 12 as molded are used without further machining since they are often made of ceramic materials which are extremely difficult to machine. However, they can be molded to fairly close tolerances and it is very desirable to use these as received without additional expensive machining operations. With tolerances in the range of ±0.002" to 0.005" in radial depth, when assembled on the core, the diameter of individual pairs of segments 180° apart will vary an amount comparable to the thickness of the steel cylinder 13 which must be assembled over them with residual tension.

The outer cylinder 13 is preferably made of a relatively thin sheet of stainless steel in the shape of a tube. For example, 300 Type stainless steel having a thickness (for a small horsepower motor) of 0.005 to 0.010 inch may be used. To press such a thin cylinder over a surface having variations in diameter as mentioned above is an almost impossible task. Prior to assembly with the core 11 and the magnet segments 12, the cylinder 13 forms a straight tube and the total or overall length of the cylinder measured along its axis is longer than the axial length of the core 11 and the magnet segments 12. The normal untensioned inner diameter of the cylinder is slightly less than the outer diameter of the magnet segments 12 when mounted on the core 11, and consequently when the cylinder 13 is placed over the magnet segments 12, there is residual tension in the cylinder 13. Initially the end portions 14 of the cylinder 13 extend axially beyond both ends of the core 11.

The rotor is assembled in accordance with this invention by first positioning the arcuate magnet segments 12 in the shape of a tubular cylinder. Six arcuate segments 12 are provided in the specific example illustrated herein, and their longitudinal edges are preferably slanted to extend radially when the edges are brought close together, as shown in FIG. 1. The magnet assembly has an outer diameter which is slightly less than the inner diameter of the cylinder 13 in its untensioned state. The magnet assembly is then moved into the interior of the cylinder 13, and as shown in FIG. 3, the end portions 14 form overhangs which extend beyond the ends of the magnet assembly.

With reference to FIG. 3, a press collar 21 and a spacer 22 are positioned within the cylinder 13 and against the end surfaces of the segments 12, the collar and the spacer having inner and outer diameters which are substantially equal to those of the magnet assembly. The collar 21 and the spacer 22 fill the spaces within the overhangs of the end portions 14, and the press collar 21 also includes a radially outwardly extending flange 23 which extends across the end edge of the cylinder 13.

The rotor is assembled employing a cylindrical arbor 26 having a straight section 27 and a tapered section 28. A shoulder 29 separates the two sections 27 and 28, the straight section 27 having a smaller diameter than the adjacent end of the tapered section 28. The diameter of the straight section 27 is also slightly less than that of the rotor shaft 10.

The laminations 16 are mounted on the straight section 27 and end covers 31 are positioned at the ends of the lamination stack. In this example, the end covers 31 are thicker than the individual laminations 16 but have the same internal and external diameters. The laminations are moved to the shoulder 29, and an expanding mandrel 32 (FIGS. 3 and 4) is positioned on the tapered section 28. The section 28 and the internal surface of the mandrel 32 have the same taper, and the unexpanded diameter of the mandrel is slightly less than that of the opening formed by the magnet segments 12.

The mandrel 32 is then positioned within the opening of the magnet segments 12, and the arbor 26 is moved toward the left as seen in FIGS. 3 and 4 relative to the mandrel 32 and the segments 12. The taper of the section 28 expands the mandrel 32 and the magnet segments 12, and the segments 12 press against and cause the cylinder 13 to stretch and expand. The parts are sized so that when the mandrel 32 is moved up against the lamination stack as shown in FIG. 4, the internal diameter of the segments 12 is slightly in excess of the outer diameter of the laminations 16.

The entire assembly of the arbor 26, the mandrel 32 and the laminations 16 is then moved toward the left relative to the segments 12, as shown by the arrows in FIG. 4. The press collar 21, of course, is engaged by a member (not shown) which holds the segments 12 and the cylinder 13 against leftward movement. Thus the mandrel 32 is moved out from the opening formed by the segments 12 and simultaneously the stack of laminations is moved into the opening. When the mandrel 32 is entirely out of the opening, the tension in the stretched cylinder 13 causes the cylinder 13 and the segments 12 to contract radially inwardly, and the segments are pressed tightly against the outer surface of the lamination stack. When the mandrel 32 expands the cylinder 13, the expansion is not beyond the elastic limit of the cylinder, and the assembled diameter of the cylinder is greater than the normal or unexpanded diameter. Therefore a residual tension remains in the cylinder which presses the segments against the core 11.

The arbor 26 is then moved out of the laminations and the press collar 21 and the spacer 22 are removed, as shown in FIG. 5. The rotor shaft 10 (which has a slightly larger diameter than the section 27 of the arbor) is forced into the laminations, the parts being sized to form a tight press or friction fit.

The rotor assembly is then rotated and the end portions 14 of the cylinder are turned or spun radially inwardly. In the example shown in FIGS. 1 to 6, the end portions 14 are long enough that they overlap the end covers 31, thereby enclosing the protecting the laminations and the magnet segments. The end portions 14 further prevent the segments 12 from shifting axially.

The assembly shown in FIG. 8 is similar to that of FIGS. 1 to 7, the difference being in the construction of the end covers. In the motor of FIG. 8, the end covers 33 are placed against both ends of the rotor laminations 34 after the magnet segments 35 and the outer cylinder 36 are assembled with the laminations. The disk-shaped end covers 33 extend radially from the rotor shaft 37 to the inner surface of the outer cylinder 36, and the end portions of the outer cylinder are turned radially inwardly and overlap the end covers, as shown in FIG. 8. In other respects the construction and method of assembly of the rotor shown in FIG. 8 are the same as for the rotor shown in FIGS. 1 to 7.

By this construction, the tensioned cylinder 13 holds the magnet segments 12 on the core 11 and the metal cylinder is strong enough to withstand the centrifugal forces encountered by rotation at high speeds of the rotor. In addition, the residual tension in the cylinder 13 clamps the magnet segments 12 tightly against the outer peripheral surface of the core 11, and this fit is normally tight enough that the frictional engagement between the magnet segments and the laminations of the core 11 prevents the magnet segments 12 from shifting angularly (in the circumferential direction) on the core 11. However, if it appears that there may be a tendency of the magnet segments 12 to shift angularly on the core 11, the core 11 may be formed with angularly spaced projections such as the projections 21 illustrated in FIG. 6 of Schaefer U.S. Pat. No. 4,742,259, and the projections 38 shown in FIG. 9 herein. The projections 38 are formed on the laminations and are located between adjacent edges of the magnet segments 39. Such projections 38 form air gaps between adjacent segments and serve to angularly locate the magnet segments 39 at the properly spaced positions on the core, and the projections further prevent the magnet segments 39 from shifting in the circumferential direction during operation of the motor.

Instead of the projections 38, non-magnetic strips 41 (see FIG. 10) may be inserted between adjacent segments in order to separate the segments. Preferably at least one strip 41 has a radial width long enough to extend into an axial slot or keyway 43 formed in the outer periphery of the core laminations 44, to prevent the segments from moving angularly. Such strips 41 are inserted after the segments 42 and the outer cylinder 45 are assembled with the laminations but before the ends of the cylinder 45 are turned radially inwardly. The following is a specific example of the dimensions of a rotor in accordance with the invention:

(1) Cylinder 13, stainless steel: 0.005" thick
(2) Cylinder 13 stretched outside diameter after assembly: 2.000"
   Cylinder 13 normal outside diameter as prefabricated and before assembly: 1.996"
(3) Rotor core lamination 16 outer diameter: 1.500" plus or minus 0.0005".
(4) Inside diameter of cylinder/magnet assembly with mandrel 32 at no stretch position: 1.496".
(5) Mandrel 32 at stretched position prior to discharge of cylinder/magnet assembly to final location on core laminations 16: 1.5005".
(6) Cylinder/magnet assembly inside diameter reverts to core laminations outside diameter as it leaves mandrel.

The 1.996" dimension of the cylinder 13 keeps the total deformation to 0.004" which is within the elastic limit of the stainless steel so that it returns to grip the magnet assembly with an amount of force able to withstand centrifugal force at the maximum speed to which it would reach during motor service. In practice, the thickness of the cylinder 13 is determined by its ability to contain the centrifugal force without exceeding the stress limitation or elastic limit of the stainless steel used.

In FIGS. 1 to 6, the expanding mandrel forms an expanding means and the core plus the rotor shaft form support means for the segments and the outer cylinder. FIGS. 11 to 14 illustrate alternative expanding means and support means. In FIGS. 11 and 12, an assembly 109 of a plurality of magnet segments 112 in an outer cylinder 113 is provided, as previously described. The assembly 109 is mounted in holding means which in this instance is formed by a jig 117 and a stationary support 118, the jig having an outer sleeve portion 119 and an end portion 120. The diameter of the sleeve portion 119 is slightly greater than that of the final or assembled diameter of the cylinder 113, so that there is a gap between the cylinder 113 and the jig. The end portion 120 extends into one end of the cylinder 113 and engages the end surfaces of the magnet segments 112 thereby forming a spacer and a stop for holding the segments.

In the rotor formed by the method of FIGS. 11 and 12, a core of laminations as in FIGS. 1 to 6 is not provided. Instead, a rotor shaft 110 is provided which also expands the segments 112. The rotor shaft 110 includes a reduced diameter portion 122, a larger diameter portion 123, and an intermediate tapered portion 124. The reduced portion 122 is sized to extend loosely into the center opening formed by the segments 112 and the larger portion 123 is sized to engage the inner surfaces of the segments 113 and force the segments radially outwardly. The tapered portion 124, of course, forms an expanding means and eases the entrance of the enlarged portion 123 into the center opening. The larger portion 123 has a radius that is greater by the distance 126 than the radius of the shaft portion 122. The diameter of the larger portion 123 is sized to hold the segments 112 and the cylinder 113 in the expanded or final assembled size, as previously described, to produce a residual tension in the cylinder which holds the segments in tight assembled relation with the shaft. The shaft 123, of course, forms a permanent part of the assembly and forms a support for the segments and the cylinder. The end portion 127 may have a reduced diameter which is substantially equal to that of the portion 122 so that the same size bearings may be mounted at both ends of the shaft 110.

The method and apparatus shown in FIGS. 11 and 12 is preferably used with magnet segments having a relatively thick radial dimension. Since a ceramic magnet material is relatively brittle, thick magnets are preferred so that they do not crack under the stress as the tapered part 124 is pressed through the segments.

The method of FIGS. 13 and 14 is somewhat similar to that of FIGS. 11 and 12 except that a laminated core is provided. An assembly 209 of magnet segments 212 and an outer cylinder 213 is mounted in a jig similar to the jig 117 shown in the method illustrated by FIGS. 11 and 12. It should also be noted that a generally similar jig may be used in the method of FIGS. 1 to 10 in place of the press collar 21. A core 211 of laminations is tightly mounted on a straight diameter shaft 210. A tapered ring 221, which forms an expanding means, is positioned on the shaft 210 ahead of the core 211, the ring 221 having a forward small diameter end 222 and a larger diameter end 223. The end 222 is sized to easily enter the center opening of the magnet segments 212, and the larger end 223 expands the segments and is substantially the same as the diameter of the core 211.

After the assembly 209 has been positioned in the jig 217 and the core 211 and the ring 221 have been mounted on the shaft, the ring 221 and the core 211 are forced through the magnet segments. The segments and the outer cylinder 213 are expanded and stretched to the final assembled size by the ring 221. The ring is pressed entirely through the segments as shown in FIG. 14, and then the ring 221 is removed from the shaft 210, the core 211 and the shaft 210 then forming a support. The method of FIGS. 13 and 14 is also preferably used with relatively thick or strong magnet segments so that the segments will not crack as the ring 221 is pressed through the segments.

It will be apparent from the foregoing that a novel and useful method and apparatus for making a permanent magnet rotor for a rotating electric machine such as an electric motor have been provided. The permanent magnet segments are first assembled with the outer cylinder and then expanded against the outer cylinder so that any variations in the thicknesses of the magnet segments are transferred to the cylinder. This method is much more effective and less complex than attempting to install a very thin cylinder over the magnets after the magnets have been mounted on a shaft or core. The metal outer cylinder holds the permanent magnet segments in place against radially outward movement due to centrifugal force and also against axial movement.

What is claimed is:

1. A method of manufacturing a rotor, comprising the steps of:
   (a) positioning a plurality of permanent magnet segments at angularly spaced locations within the interior or a thin-walled metal cylinder, the interior surfaces of said segments forming an interior opening;
   (b) moving an expanding means into said interior opening formed by said segments;
   (c) moving said expanding means to displace said segments outwardly against said cylinder and elastically stretch said cylinder; and
   (d) replacing said expanding means with support means for holding said segments in said outwardly displaced positions.

2. The method of claim 1, wherein said expanding means comprises a mandrel which is moved radially outwardly to displace said segments.

3. The method of claim 2, wherein said support means comprises a rotor core.

4. The method of claim 1, wherein said expanding means comprises a tapered portion of a shaft, and said support means comprises a core.

5. The method of claim 4, wherein said core comprises a straight diameter portion of said shaft.

6. The method of claim 1, wherein said expanding means comprises a tapered ring.

7. The method of claim 6, wherein said support means comprises a core which displaces said ring.

8. A method of manufacturing a rotor, comprising the steps of:
   (a) positioning a plurality of permanent magnet segments at angularly spaced locations within the interior of a thin-walled metal cylinder;
   (b) displacing said segments to radially outwardly displaced positions against said cylinder sufficient to elastically stretch and create residual tension but not plastically deform said cylinder; and
   (c) holding said segments in said outwardly displaced positions against the force of said residual tension.

9. A method of manufacturing a rotor for a rotating electric machine, the rotor including a substantially cylindrical core, a plurality of arcuate permanent magnet segments, and a thin-walled metal cylinder, the inner surfaces of said segments substantially conforming to the outer surface of said core and the outer surfaces of said segments substantially conforming to the inner surface of said cylinder, said method comprising the steps of:
   (1) positioning said segments within the interior of said cylinder at substantially regular angularly spaced locations to form a circular interior opening,
   (2) positioning an expandable mandrel within said interior openings,
   (3) expanding said mandrel and thereby forcing said segments outwardly and stretching said cylinder to elastically increase the diameter of said cylinder, the expanded diameter of the mandrel being at least as large as the diameter of said core,
   (4) sliding said mandrel out of said interior opening of said segments and simultaneously sliding said core into said interior opening.

10. The method set forth in claim 9, wherein said core includes a plurality of radial projections on its outer surface, and said projections are positioned between said segments as said core is slid into said interior opening.

11. The method set forth in claim 9, and further including the step of inserting nonmagnetic spacers between adjacent magnet segments.

12. The method set forth in claim 11, and further including the steps of forming an axially extending keyway in the outer surface of said core, and positioning one of said spacers in said keyway.

13. The method set forth in claim 9, and further including the step of positioning end covers at the ends of said core, and turning end portions of said cylinder radially inwardly.

14. The method set forth in claim 9, and further including the step of turning end portions of said cylinder radially inwardly.

15. Apparatus comprising a rotor including a plurality of arcuate magnet segments and a thin outer cylinder, said segments being positioned at angularly spaced positions within said cylinder and said sleeve having residual tension and thereby pressing said segments radially inwardly, in combination with, expanding means for displacing said segments radially outwardly sufficiently to elastically stretch but not plastically deform said cylinder and thereby create said residual tension, and support means for holding said segments in outwardly displaced positions.

16. Apparatus as set forth in claim 15, wherein said expanding means comprises an expanding mandrel, and said support means comprises a rotor core.

17. Apparatus as set forth in claim 15, wherein said expanding means comprises a tapered portion of a shaft, and said support means comprises a straight diameter shaft.

18. Apparatus as set forth in claim 15, wherein said expanding means comprises a tapered ring, and said support means comprises a straight diameter shaft.

* * * * *